US006834669B2

(12) United States Patent
Seyfarth

(10) Patent No.: US 6,834,669 B2
(45) Date of Patent: Dec. 28, 2004

(54) INTEGRATED PNEUMATIC MANIFOLD

(76) Inventor: Otto Herman Seyfarth, P.O. Box 10666, Centurion 0046 (ZA)

(*) Notice: Subject to any disclaimer, the term of this patent is extended or adjusted under 35 U.S.C. 154(b) by 85 days.

(21) Appl. No.: 10/291,628

(22) Filed: Nov. 12, 2002

(65) Prior Publication Data

US 2003/0127144 A1 Jul. 10, 2003

(30) Foreign Application Priority Data

Nov. 12, 2001 (ZA) ........................................ 2001/7516

(51) Int. Cl.[7] ................................................ F16K 11/10

(52) U.S. Cl. ....................................... 137/354; 137/884

(58) Field of Search ................................ 137/351, 354, 137/884

(56) References Cited

U.S. PATENT DOCUMENTS

| | | | | | |
|---|---|---|---|---|---|
| 2,703,104 | A | * | 3/1955 | Le Tourneau | 137/354 |
| 4,469,128 | A | * | 9/1984 | Petrimaux et al. | 137/554 |
| 4,507,707 | A | * | 3/1985 | Willis | 361/679 |
| 4,557,292 | A | * | 12/1985 | Nicolas et al. | 137/596.16 |
| 5,458,048 | A | * | 10/1995 | Hohner | 91/459 |
| RE35,969 | E | * | 11/1998 | Lalone et al. | 137/354 |

* cited by examiner

*Primary Examiner*—John Fox
(74) *Attorney, Agent, or Firm*—Jacobson Holman PLLC

(57) ABSTRACT

An integrated pneumatic manifold for installations that require electrical and other components to be separated from a harmful or dangerous environment, in which pneumatic (and/or hydraulic) devices operate, the manifold comprising a block that has drilled into it a large number of passages that are directed in various directions and located at various levels, some passages crossing partially and some wholly with others and cavities machined in various positions. The block has mounting points for components on its surfaces and passive and active pneumatic components are integrated into the cavities and passages of the block. The block serves as a separation between the safe and harmful environments and as a substitution for many passive and active pneumatic components that would normally be individually connected.

6 Claims, 6 Drawing Sheets

INTEGRATED PNEUMATIC MANIFOLD

BACKGROUND OF THE INVENTION

The invention lies in the field of pneumatic, hydraulic, electrical and other control systems for vehicles and fixed installations.

In conventional practice in electro-pneumatic systems design engineers tend to place pneumatic and electro-pneumatic control components in positions most convenient (e.g. nearest) to the actuators that they control. The benefit of quick reaction times is achieved by use of short pneumatic tubes, which are important in some applications, e.g. in feedback control loops and others where significant response hysteresis is experienced. However, locating pneumatic and electro-pneumatic control components near the actuators that they control often exposes them to a harsh environment.

In fixed applications electrical components may not be located in explosive or fiery environments nor in corrosive environments. For example, packaging machinery, which uses pneumatic actuators requires the electrical components to be In an isolated enclosure because spray painting and other sources of flammable mixtures in the air occur. Corrosive environments also obtain and would cause rapid deterioration of electrical components if exposed to them.

In vehicle applications, heat, dirt, oil, physical blows and vibration are typical of the harsh environment conditions, which are not conducive to reliable long-term performance of the components.

Electro-pneumatic components require air supply and delivery tubing as well as electrical connections for control functions. Complicated electrical harnesses have to be made and installed to provide electrical interconnections between various components. Pneumatic components have to be mounted on small, precise mounting brackets located inside hostile environments, like an engine compartment. During mounting of major components like machinery, e.g. engines and gearboxes in vehicles, these are often damaged and have to be repaired/replaced or otherwise reworked during installation and/or assembly. Time consuming work by qualified technicians is required in assembly and installation, maintaining high standards of reliability of the work. For example, in an assembly line the connections of pneumatic lines and electrical wiring harnesses and connections have to be made, requiring lengthy time periods and testing procedures. The tubes and wiring harnesses have to be channelled through the vehicle firewall from the engine compartment to the cab where the driver utilizes the controls. Different vehicle models require variations in control systems, resulting in a large number of different components, hole configurations, assembly procedures and reliance on extensive and detailed knowledge by technicians and accurate implementing of this in assembly work on the production line. Assembly/installation time, cost and quality are all adversely affected.

While these approaches to pneumatic installations are being continued to be used, the inventor has perceived the need to address the problems inherent in them. The solution of these problems is provided by the invention of a concept of general application, as herein defined in the appended claims.

While this discussion centres on pneumatic installations, the invention can in principle be applied in hydraulic installations, where similar considerations apply.

THE INVENTION

According to the invention, an electro-pneumatic installation is provided characterised by an integrated pneumatic manifold in the form of a single block, perforated by a plurality of internal channels that are variously oriented in three dimensions and selected for a defined installation, the block adapted to be mounted in a single opening in a fire wall of a vehicle or other mounting of a stationary installation, the block having provision made on its obverse and reverse faces for mounting of electro-pneumatic relays and components, with connections for electrical wiring at its obverse face and pneumatic tubing to the electro-pneumatic relays and components, for supply of pneumatic air to input channels of the block and for receiving pneumatic control air from output channels of the block.

The effect of this approach, is that the electro-pneumatic control components are not mounted in the vicinity of where they must do their work, but on the obverse side of the block and tubing is connected from the reverse side of the block, to the actuators to which the pneumatic actuation must be applied, for example, hydraulic equipment and other actuators. Although a time delay is therefore experienced down the length of the tubing, it is found that in many applications, for example in particular in vehicle applications, the distance down the tubes is not so long as to pose any problem at all. Where required such delays can be negated by selecting larger orifice valves, fittings and tubing to allow higher flow rates.

In addition, the electro-pneumatic relays are mounted on the obverse side of the block and wiring harnesses have only to bring electrical wiring to that side of the block, and not into the engine compartment to a multiplicity of locations or analogously in a stationary installation. The advantage of a central point for all wiring connections is achieved. The electro-pneumatic relays can be located in protected environments, for example, in the case of vehicles, on the obverse side of the block that faces e.g. the air conditioned space of the driver's cab, which is usually mounted on sprung and shock absorbing mountings.

The passages of the block replace a multiplicity of connectors, such as inline connectors, tee pieces, brackets connectors and many others. As a result, the leakage risk of such connectors is eliminated and the number of fittings is dramatically reduced. The air connections of the electro-pneumatic components made to the block can be tested in the factory, on a test bench, in a speedy and reliable way. The block can be supplied with a test certificate verifying the correct functional operation of all components before installing the integrated pneumatic manifold (IPM) into the vehicle or machine.

An aperture in a vehicle firewall or the installation cabinet for the block can be of a single dimensioning that can be standardised for many different models of vehicle or installation and the differences catered for by blocks that have the same outside dimensions but different internal passages, with their components already installed.

As a result, much skill and knowledge need not be required in the assembly line or installation procedures, reducing the levels of skill required, for reliable and quality installations. In effect, the skill, knowledge and quality are built into the block and its attached components, in the fabrication and assembly of the block, where these requirements can be more easily met and controlled. For example, machining of the block can be specified completely in the software programming of a CNC machine, so that repeatable reliability and quality can be assured at much lower cost and much less human factor involved. The machining of the block is complex, but using manufacturing batch numbers and a unique serial number for each design as well as engraved labels for various port connections add further assembly and servicing advantages.

The invention also allows selection of interface sealing type of components, which do not require to be screwed into the block with a turning motion imparted to the component. This allows reduction of the block size to a minimum and simplifies servicing and maintenance.

Selection of all electrical components for connections to be made with screw-on captive type plugs allows for fast original connection and replacement without the danger of connections loosening due to vibration.

It is possible by the use of the block to re-design some functions in order to improve safety and reliability. Additional functions such as an air supply for inflating tyres, in the case of application to a vehicle, and connections for possible optional extra equipment at a later stage, can be provided.

Assemblies such as non-return valves, shuttle type valves and restrictor orifices can be designed into the block, instead of being provided as separate components which have to be connected in line.

THE DRAWINGS

The invention is more fully described by way of example, with reference to the drawings, in which.

THE PREFERRED EMBODIMENTS

Figure 1:
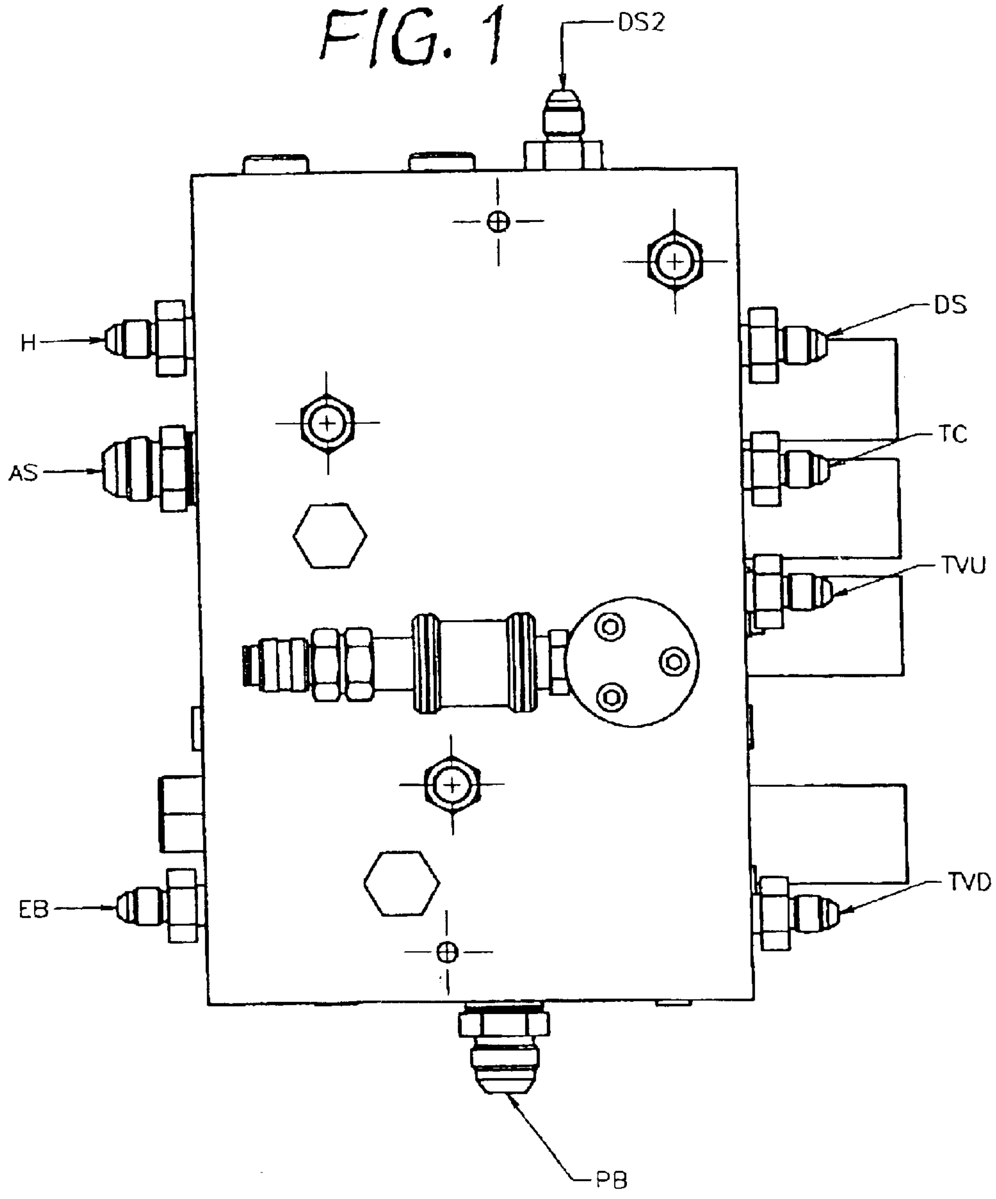
FIG. 1 is an elevation of the reverse side of the block.
Figure 2:
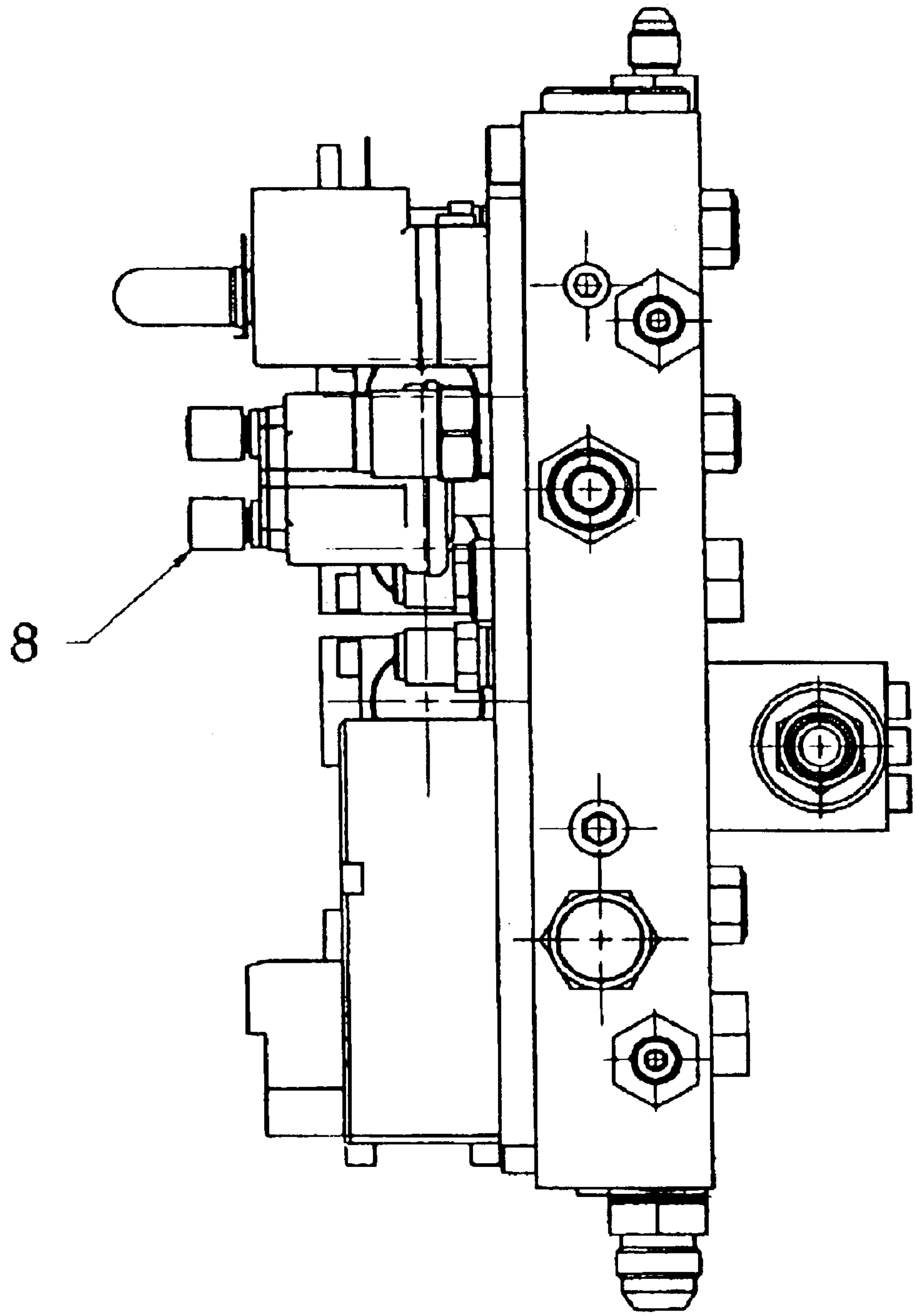
FIG. 2 is a side elevation of the block.
Figure 3:
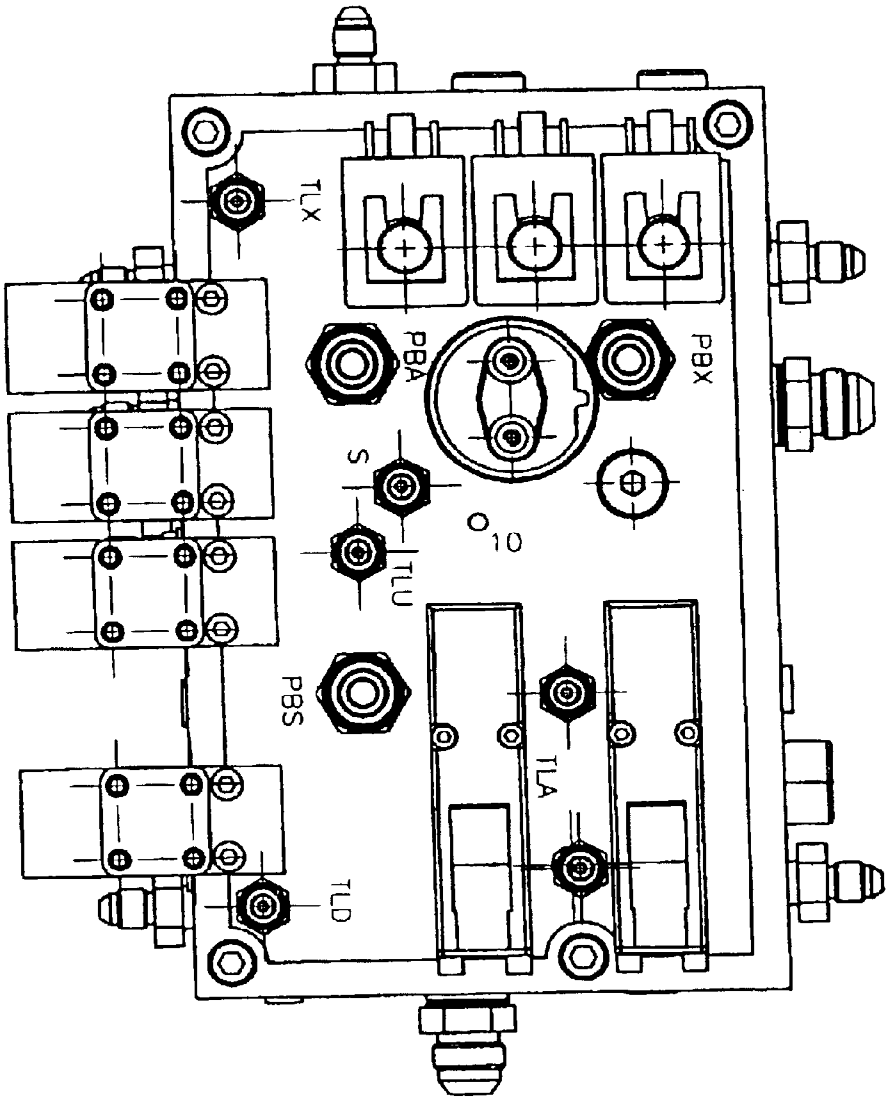
FIG. 3 is an elevation of the obverse side of the block.
Figure 4:
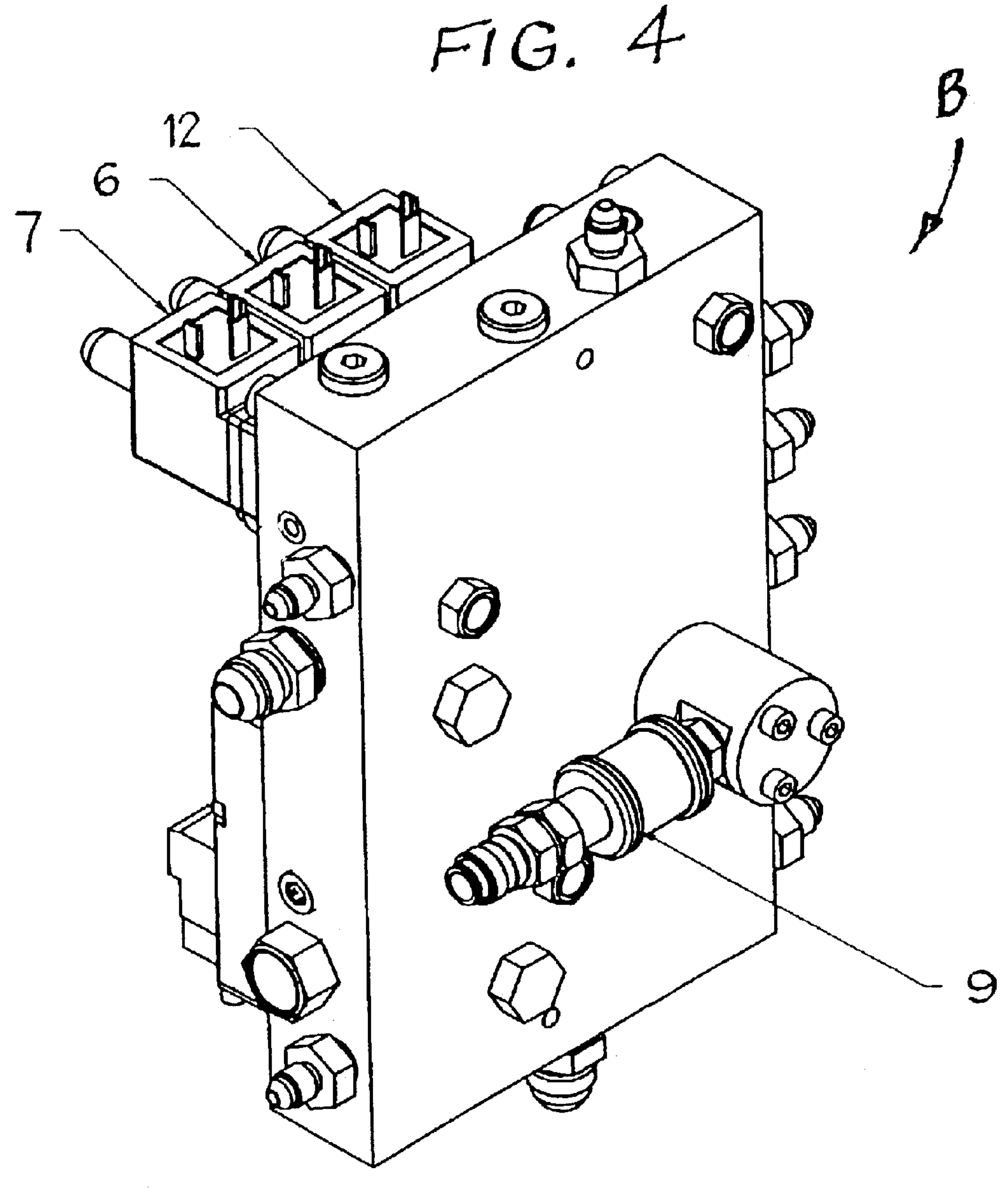
FIG. 4 is an isometric view of the reverse side and side of the block.
Figure 5:
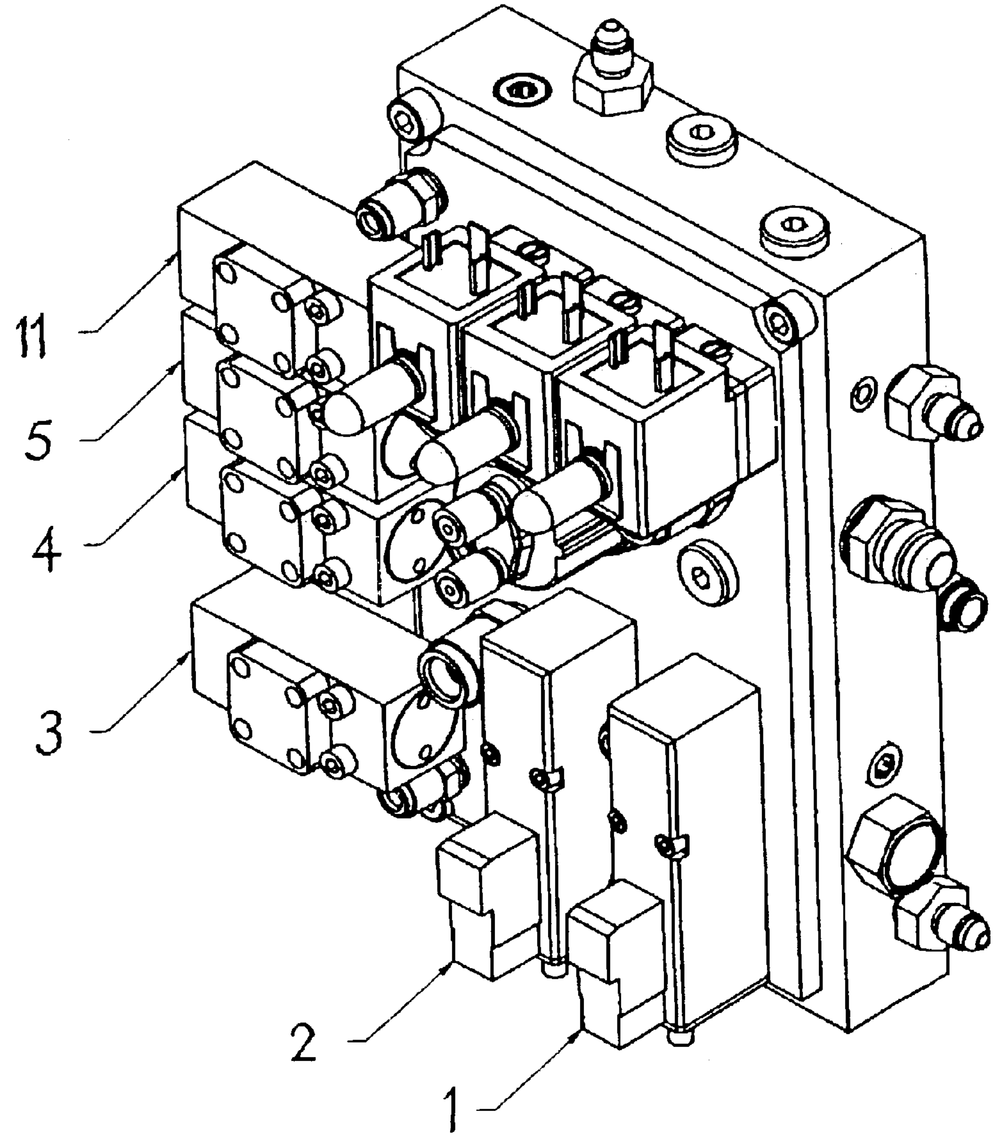
FIG. 5 is an isometric obverse side and side view of the block.

The preferred embodiment is shown in the drawings. It is an example, which can be used for heavy vehicles. It comprises a block B, which is rectangular in its shape, only high quality Swiss aluminium is used to ensure non-porosity. Components are selected from suppliers in Germany, England, Switzerland, Spain and USA. The design uses ISO and other world wide accepted standards to ensure interchange of components from various suppliers.

The integrated pneumatic manifold is machined using a four axis CNC machining centre and modifications can be made in minutes using this system as opposed to injection moulding in which changes can not be made economically. This makes the system suitable for short production runs which are experienced typically in second and third tier industrialized countries and also in some cases in first tier industrialized countries.

The components that are on the protected side of the block include solenoids 1, 2, 6 and 7, pressure switches 3, 4, 5 and 11, pressure senders 8 and 10, and an auxiliary air connection 9.

The connections, which are made to the block from the exposed side are the various valves for control of air to the actuators and air supply or supplies.

Various connections are made to the components on the protected side.

A series of harnesses are supplied for electrical connections to the block.

Figure 6:
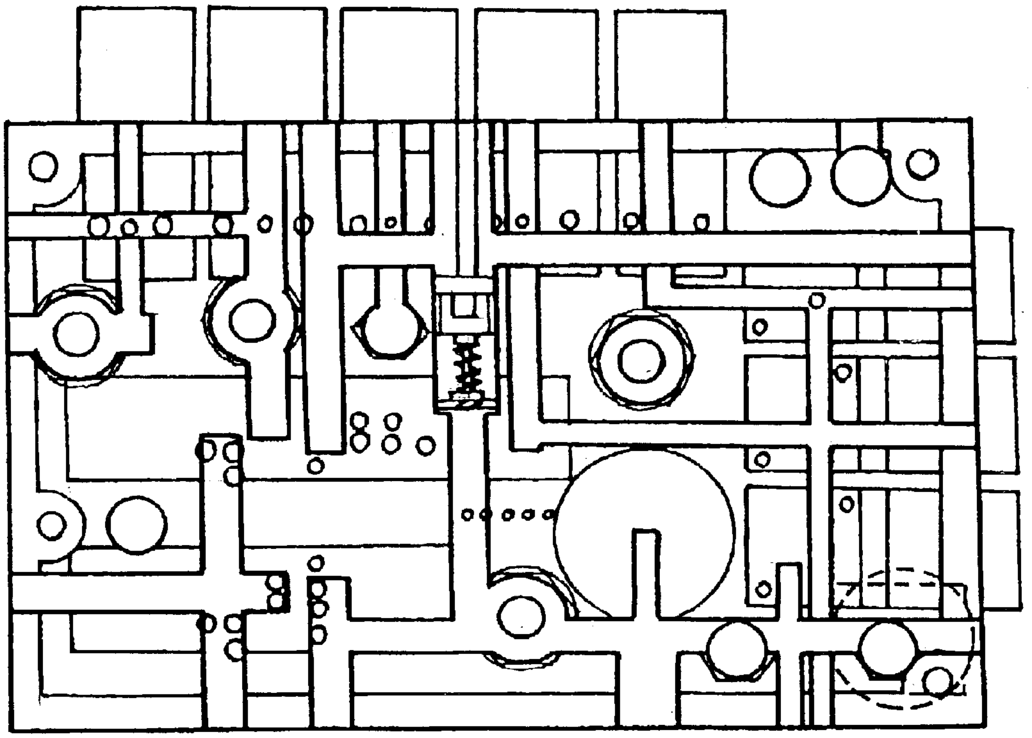
FIG. 6 is a view of internal channels in the block.

The drillings in the block are shown in FIG. 6. A large number of fittings and tubing are eliminated with a lower risk of leaks in the system. A typical fitting count of 156 is reduced to 29 and logistics and assembly line time are drastically reduced. The supply as a completely tested and functional unit allows traceable quality standards. Fault finding in the old system required tedious testing with a soap brush over the many fittings.

Thus it can be seen that an IPM consists of a solid material, for example, aluminium or a suitable plastic, into which a multitude of channels are drilled and special cavities machined to makeup a completely integrated pneumatic manifold. One or more of the following features make up an IPM:

1) Integration of component housings:
   - i) passive components are those that make no change to the flow of the media and are normally fittings such as T-pieces, cross pieces and multiple choice outlets. The IPM completely integrates these components by having the relevant features of those components machined into the IPM body. Simply cross drilling into a channel in the IPM body will replace a T piece, whilst multiple drillings will replace several T-nor cross-pieces;
   - ii) sub-bases for interface-type mounting components are also passive components that are eliminated completely by machining the relevant connection points directly into the IPM body;
   - iii) In-line or exhaust type filters may also be classed as passive components and the integration is achieved by omission of the filter body and by assembling the filter or silencing media into suitably machined cavities in the IPM body.

b) Active components:
   - i) Active components are those that are designed to change, restrict or control the media in some way that the designer wishes to incorporate into the specific unit;
   - ii) The IPM integrates these components by eliminating the bodies or housings of these components. Instead the required cavities for the operators are machined into the IPM body. The operators are then assembled into these cavities in order to become a functioning unit;
   - iii) examples of active components include:
     - non-return valves
     - adjustable flow restrictor valves and fixed restrictor nozzles
     - OR valves (shuttle valves)
     - slide, ball or disc-type valves
     - multiple port valves that maybe activated by pneumatic, hydraulic or electrical signals
     - pressure switches
     - pressure senders providing analogue outputs relative to media pressure applied to a piston or diaphragm
     - pressure or flow regulators
     - active filters such as chemical or vortex types
     - actuators may be integrated into an IPM by eliminating the cylinder in favour of a suitably machined hole in the IPM into which a piston with rod and seals are fitted.

2) Replacement of fittings and tubing:
   by creating a multiple level labyrinth of channels in the IPM body, a vast number of connections can be designed to interconnect the various components and connecting points completely eliminating the need for fittings or tubing:
   - a) multiple outlets
   - b) where traditional T-pieces and even multiple T-pieces and cross pieces are screwed together in order to provide multiple outlets, the required number and size of connecting points are simply machined into the IPM body c) change of connection dimensions—instead of using adaptors in order to change from one tube size to another, the IPM is simply machined with the desired connection sizes d) change of connecting specifications—quite often there is a need for the screwing together of various thread configurations; instead of special or multiple adaptors, the IPM is machined with the required threads for the designer's application 3) Interconnecting between components:

by creating a multiple level labyrinth of channels in the IPM body, a vast number of interconnections can be designed to interconnect the various components and connecting points thereby eliminating the need for fittings and tubing to a large extent.

4) Physical mounting of components:

mounting of components such as interface type valves and pressure switches directly onto the IPM provides a suitable physical mounting position in addition to the immediate connecting to the IPM channels for the media to be controlled or directed by the so mounted components.

5) Through point from one environment to another.

6) It is often required or desired to have certain components in one area whilst the other connections or components are in another area. Two examples will be referred to in this document or although many other scenarios are possible:

a) an earth moving machine requires several valves, pressure switches and other non-electric components to operate the pneumatic systems. These can be safely and securely mounted on the one side of an IPM inside the driver's cab, which provides a better environment in terms of heat, dirt and vibration than the engine compartment. Connections to the actuators and other equipment controlled by the components are made with suitable tubing connected to the reverse side of the IPM. The use of bulkhead type fitting to facilitate the connection between cab and engine compartment are eliminated by passing all connections through a standard sized cut-out in the firewall of the earthmoving machine;

b) in a packaging machine the actuators and other controlled components are possibly situated in a hostile environment where corrosion and/or hazardous situations dictate the use of specially coated components or the use of exotic materials; fitting the control components and other components inside a suitably sealed cabinet is again allowed by the use of an IPM to mount the components, interconnect a large part of the connections and provide a suitable means of connecting the through connections into the IPM and not by using bulkhead type fittings fitted through multiple (and often different sized) drilled holes.

As a complete assembly the system lends itself to a service exchange approach. The whole block can be changed in a matter of minutes getting the vehicle or machine back into productive operation quickly. Service of the block taken out can then be undertaken in a high standard workshop equipped with calibration facilities to ensure consistent high performance of repaired units, Other examples of applications for the integrated pneumatic manifold are fire fighting control circuits, food processing machines, packaging machinery, bus body controls, etc.

What is claimed is:

1. An electro-pneumatic installation, characterised in that the installation comprises an integrated pneumatic manifold that is in the form of a single block, perforated by a plurality of internal channels that are variously oriented and located in three dimensions and selected for a defined installation, in that the block is mounted in a single standardised opening in a wall that separates two environments, the block having mounted on its obverse face electro-pneumatic relays, with the relays in pneumatic communication with the channels, with connections of electrical wiring to connectors on the electro-pneumatic relays at its obverse face, with connections of pneumatic tubing and components from its reverse face for receiving pneumatic control air from output channels of the block and leading it to actuators at which the pneumatic actuation must be applied, and with connections of pneumatic supply air to input channels of the block.

2. An electro-pneumatic installation as claimed in claim 1, characterised in that wiring harnesses are used to bring the electrical wiring to a central point for connection to the electro-pneumatic relays that are mounted on the obverse side of the block, that the electro-pneumatic relays are located in a protected environment and that the block mounting is sprung and shock absorbed.

3. An electro-pneumatic installation as claimed in claim 1, characterised in that the air connections of the electro-pneumatic components made to the block are tested in the factory, on a test bench before installation and the block is supplied with a test certificate.

4. An electro-pneumatic installation as claimed in claim 1, characterised in that the selection of the internal channels is specified completely in the software that is then programmed into a computer-numerically controlled (CNC) machine that carries out complex machining of the block, using manufacturing batch numbers and a unique serial number for each design as well as engraved labels for various port connections.

5. An electro-pneumatic installation as claimed in claim 1, characterised in that interface sealing type of relays and components, which do not require to be screwed into the block with a turning motion imparted, are connected to the block and in that electrical components are selected that have connectors that allow electrical connections to be made with screw-on captive type plugs.

6. An integrated pneumatic manifold for an installation as claimed in claim 1, characterised in that the manifold is in the form of a single block, perforated by a plurality of internal channels that are variously oriented in three dimensions and selected for a defined installation, the block adapted to be mounted in a single standardised opening in a fire wall of a vehicle, the block having provision made on its obverse and reverse faces for mounting of electro-pneumatic relays and components, with connections for electrical wiring to connectors on the electro-pneumatic relays at its obverse face, with connections for pneumatic tubing and components from its reverse face for receiving pneumatic control air from output channels of the block and leading it to actuators at which the pneumatic actuation must be applied, and with connectors pneumatic supply air to input channels of the block.

* * * * *